Feb. 16, 1954   HENRI-GEORGES DOLL   2,669,689
               METHOD AND APPARATUS FOR DETERMINING
                     EARTH FORMATION FACTORS
Filed April 13, 1945                          2 Sheets-Sheet 2

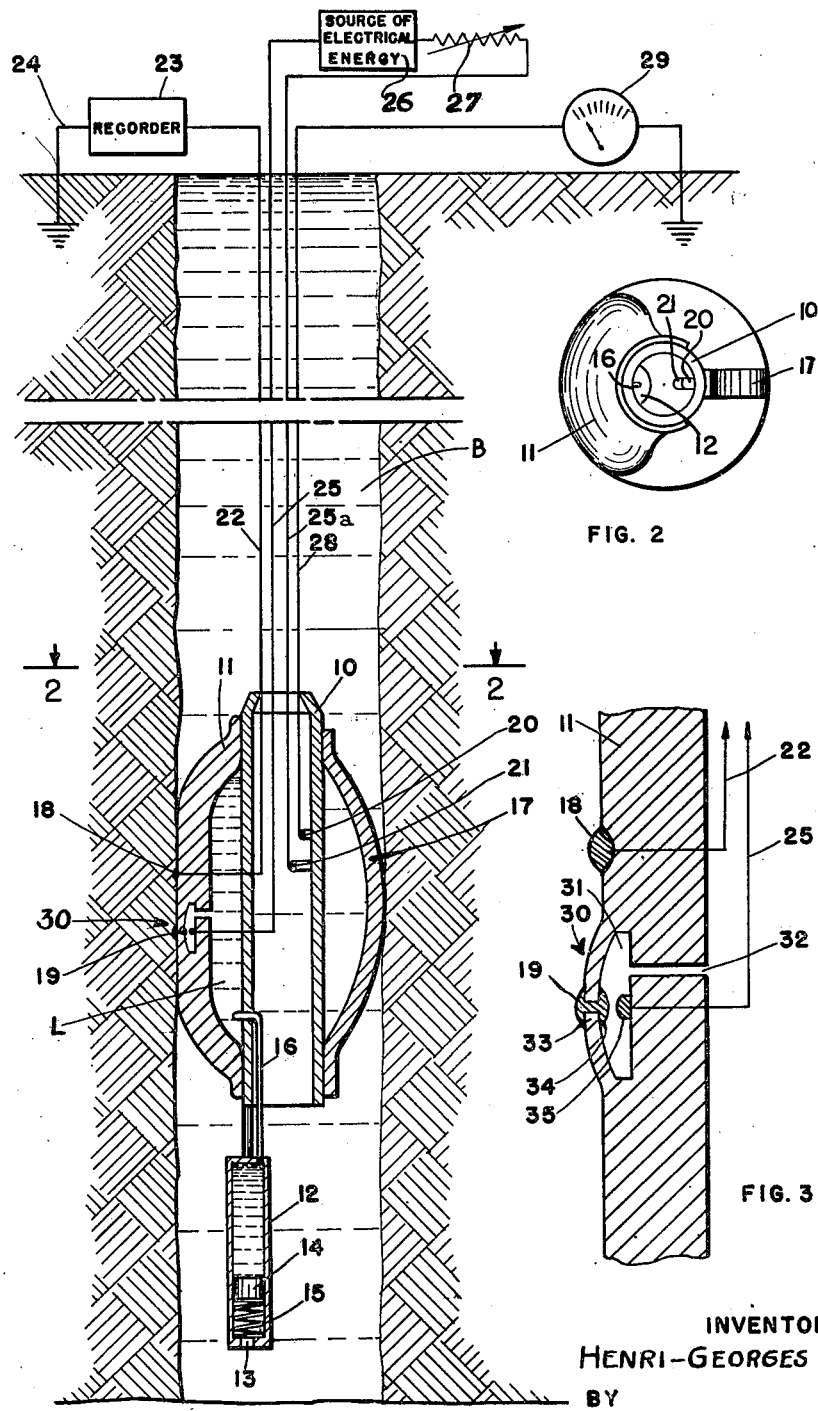

INVENTOR.
HENRI-GEORGES DOLL
BY
Campbell, Brumbaugh, Free & Graves,
HIS ATTORNEYS.

Patented Feb. 16, 1954

2,669,689

UNITED STATES PATENT OFFICE 2,669,689

METHOD AND APPARATUS FOR DETERMINING EARTH FORMATION FACTORS

Henri-Georges Doll, Houston, Tex., assignor to Schlumberger Well Surveying Corporation, Houston, Tex., a corporation of Delaware Application April 13, 1945, Serial No. 588,228

17 Claims. (Cl. 324—1)

This invention relates to apparatus and methods for determining the formation factor of subsurface formations. It relates particularly to methods and apparatus for determining the formation factor of formations traversed by a bore hole by measurements taken in the bore hole.

The formation factor is defined as the ratio of the formation resistivity when the formation is saturated with water to the resistivity of the saturating water, or expressed as follows:

$$F = \frac{\text{formation resistivity}}{\text{fluid resistivity}} = \frac{Rf}{Rw}$$

The formation factor is useful in calculating the proportions of oil and water in a formation and for obtaining indications of the production that may be expected from, or the reservoir capacity of, a formation.

In geophysical exploration, it is desirable to obtain all the information possible on the characteristics of the subsurface formations in order to better determine the procedure to be followed in finishing the well and producing oil therefrom.

When drilling an oil well, data regarding the formation may be obtained in many different ways. One of the most reliable and useful methods of obtaining such data or information is electrical logging. Electrical logging may be accomplished in many different ways, but almost invariably such electrical logging includes the measurement of the resistivities of the formations.

While the electrical log is generally used for making correlations between wells and for estimating the nature of its formations and its fluid content, the resistivity curves may be utilized in conjunction with other information for arriving at estimates of the reservoir capacity and possible amount of production.

The resistivity of the formations traversed by the bore hole depends largely upon the resistivity of the fluid contained in the formation. When drilling by the rotary method, the bore hole is usually kept full of a suitable drilling fluid which exerts a greater hydrostatic pressure on the formations than the natural formation pressure, with the result that the drilling fluid invades the permeable formations to some extent.

Resistivity measurements may be made that include the invaded zone, the invaded zone and the uninvaded zone, or essentially only the uninvaded zone by altering the electrode spacings, thus varying the lateral depth of investigation. When the formation thickness is sufficient to permit the use of large electrode spacings, the recorded resistivity is the true formation resistivity for all practical purposes, as explained in detail in a paper entitled Determination of the Potential Productivity of Oil Bearing Formations by Resistivity Measurements by Martin, Murray and Gillingham, appearing in Geophysics, volume 3, No. 3, July 1938. This so-called "true resistivity" is a function of both the formation and the fluid it contains. Thus, if the resistivity of a permeable zone is very low, for example, less than one-half ohm, it is usually conclusive evidence that the formation contains salt water, only. If the resistivity of a permeable formation is very high, it is an indication that the formation fluid is predominately oil or gas and that no salt water is present in this formation. In the usual case, resistivity values between these two extremes are obtained. However, the resistivity measured does not necessarily indicate that a formation having a high resistance would produce clean oil only, while a formation having a relatively lower resistance would produce salt water primarily. In fact, it has been found in many cases that a formation that produces clean oil may have a lower resistivity than another formation that produces salt water. This discrepancy in resistivity value is caused by the nature of the formation itself and is dependent upon the shape and size of the grains or particles in the formation, the type of cementation, porosity, permeability, and other physical characteristics. Moreover, it appears that the reason some formations produce clean oil rather than salt water even when there may be as much as 30% or even higher percentage of salt water is that the surface tension of the liquids and their affinity for the formation are such as to cause the water to be retained in the formation while the oil escapes.

As indicated above, when the resistivity shown by the electrical log is in the midportion of the range of resistivity values, the resistivity alone is not a sufficient basis for a prediction of the percent of oil present or whether clean oil will be produced. Another value, the formation factor, is required. The value of this factor generally is between 5 and 100 for permeable formations. When the formation resistivity and the formation factor are known, the average resistivity of the formation fluid can be approximated by dividing the formation resistivity by the formation factor. From a knowledge of the resistivity of the connate water, the oil-water ratio can be computed. By comparison of the calculated oil-water ratio in the formation with the known oil-water ratio of producing wells in the same field, it is possible to predict whether clean oil can be produced from the formation.

Through the use of the formation factor, it is also possible to estimate the total reservoir capacity of an oil well. The electric log provides data regarding the thickness of the formation. Other data may be obtained for indicating the area from which oil drainage may be expected, and on the basis of these data, the volume of the formation can be estimated. If the porosity fraction, that is, the fraction of the formation that is not filled by solids, is known, the total volume that could be filled with liquid can be determined. By multiplying this volume by the oil fraction, the total volume of oil may be estimated.

In order to make these calculations, it is necessary to know the formation factor and the porosity fraction. A paper entitled, The Electrical Resistivity Log as an Aid in Determining Some Reservoir Characteristics, by G. E. Archie, appearing as A. I. M. M. E. Technical Publication No. 1422, dated October 1941, states that it has been found that the formation factor is related to the porosity as expressed by the following formula:

$$F = P^{-m}$$

where P is the porosity fraction and $m$ is a constant whose value is approximately 2. $m$ has been found to vary from 1.3 to 2 for clean sands and can be determined for each field or formation by laboratory measurements on the cores. Thus, if the formation factor could be easily and quickly determined, the porosity could be estimated from the above equation and calculations of the reservoir capacity could be made.

Determination of the formation factor is not new. Heretofore it has been determined by testing core samples. The tests usually consist of taking one or more cores from each formation, then flushing or washing and drying the cores thoroughly, usually under vacuum. While under vacuum, the cores are flushed or washed with water of known resistivity. After the cores are saturated with this standard water, the resistivity of the core sample is measured. The formation factor is then given by the quotient of the resistivity of the saturated formation and the resistivity of the water, as indicated above.

The above described method of obtaining the formation factor is very expensive and time-consuming, and, moreover, the core method sometimes is unfeasible for the reason that in loose, sandy formations it is very difficult to obtain a good sample. Such a loose, sandy core falls out or is washed out of the core barrel while it is being brought to the surface.

An object of the present invention is to provide methods and apparatus for obtaining indications of the formation factor continuously in a drill hole.

Another object of the invention is to provide methods and apparatus for automatically providing records of the formation factor taken continuously along a bore hole.

Other objects of the invention will become apparent from the following description of typical methods and apparatus for practicing the present invention.

The present invention comprises measuring the resistivity of the drilling fluid and the resistivity of the invaded formation simultaneously and obtaining indications of a variable which is a function of the quotient of these two measurements.

The measurement of the resistivity of the drilling fluid is made in such a way that it is unaffected by the presence of the formation and the measurement of the resistivity of the formation is made so that it is unaffected by the presence of the bore hole and its drilling fluid. Each of these two resistivity values may be obtained independently and a curve representing the formation factor may be produced either manually or automatically from these indications. Preferably, a direct indication of the formation factor is obtained by holding one of the resistivity measurements constant and recording directly the other measurement.

The apparatus for making the measurements may consist of an electrode system adapted to be lowered into a bore hole which is provided with pairs of closely spaced electrodes, one pair being substantially in contact with the formation and the other pair in contact with the drilling fluid and substantially insulated from the pair in contact with the formation. The spacing of the electrodes preferably is such that the lateral depth of investigation is very short so that only the resistivity of the formation closely adjacent the electrodes in contact with it is measured and only the resistivity of the liquid closely adjacent the other pair of electrodes is measured. In this way, the measurements are independent and the resistivity of the formation is not affected by the bore hole or the liquid therein and the measurement of the resistivity of the liquid is not affected by the formation adjacent the bore hole.

For a better understanding of the present invention, reference may be had to the accompanying drawing in which:

Figure 1 is a view in longitudinal section of a bore hole containing an apparatus of a type embodying the present invention, shown in vertical section;

Figure 2 is a plan view of the apparatus taken in the direction indicated by the arrows 2—2 of Figure 1;

Figure 3 is an enlarged view in section of a portion of the apparatus disclosing details of the packer electrode and switching construction;

Figure 5:
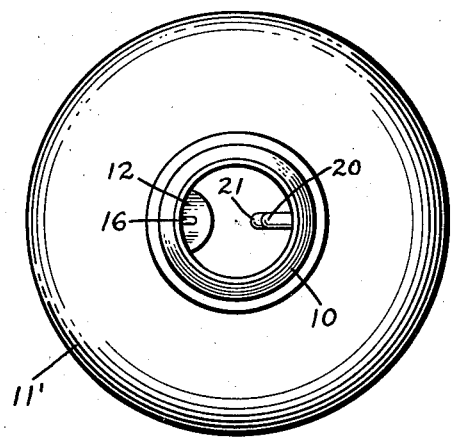
Figure 5 is a plan view of a modification of the apparatus shown in Figures 1 and 2.

Any of the known methods of measuring the resistivity of the formations and fluid, such as those disclosed in the Schlumberger Patent No. 1,819,923 or the Schlumberger Patent No. 1,894,328, may be used for obtaining indications of the formation factor. The apparatus disclosed in the drawing for illustrating the invention is a two-electrode system, although one, three, or four electrode systems may be used, if desired. Referring to Figure 1, the apparatus for determining the formation factor may include a tube 10 formed of insulating material which carries a packer 11. The packer 11 may consist of a sleeve of flexible material such as rubber that is adapted to be inflated sufficiently to engage the wall of the bore hole B. The form of packer 11 illustrated includes a segmental sleeve formed of rubbery material extending only partially around the tube 10 and secured at its edges to the tube. This packer may be caused to engage the wall of the bore hole by means of a pressure system which includes a cylinder 12 having an opening 13 in its lower end and containing a piston 14 that is normally urged upwardly by means of a spring 15. The upper end of the cylinder 12 is connected to the interior of the packer 11 by means of a pipe or conduit 16 so that liquid L in the portion of the cylinder 12 above the piston 14 is at the same pressure as the liquid between the packer 11 and the tube 10. Inasmuch as the piston 14 is subjected not only to the pressure of the spring 15, but to the pressure of the fluid or liquid surrounding the packer and the cylinder, the pressure exerted by the packer against the wall of the bore hole will always be in excess of the pressure of the bore hole liquid, thereby assuring positive engagement of the packer 11 with the wall of the bore hole. The tube is further guided in the bore hole and maintained substantially centered therein by means of a bow spring 17 on the tube 10, directed oppositely to the packer 11 and engageable with the wall of the bore hole.

The above described packer arrangement can be modified considerably and other means may be provided for inflating and deflating the packer, as desired. For example, the packer may be inflated or deflated by means of a turbine such as that disclosed in the Mennecier application Serial No. 409,605, so that the packer is inflated only when electrical energy is furnished to the turbine. Alternatively, mechanism may be provided for tripping the piston 14 in order to deflate the packer when it is desired to move the assembly along the bore hole. Moreover, the packer 11 may be a sleeve completely surrounding the tube 10, if desired.

The last mentioned embodiment of this invention is illustrated in Figure 5. Surrounding the tube 10 is a packer 11', adapted to be inflated or deflated by means of the apparatus discussed in connection with the packer 11. It is apparent that the packer 11' may be substituted for the packer 11 in the representative form of the invention disclosed herein.

The packer 11 is provided with a pair of closely spaced electrodes 18 and 19 for determining the resistivity of the formation. Preferably these electrodes are spaced apart a distance less than the length of the radius of the bore hole.

Of course, since the permeable formations are covered by a so-called "mud cake," as described in U. S. Patent No. 2,396,935, the electrode spacing should preferably be made sufficiently great to insure that the resistivity indications obtained will not be materially modified by the resistivity of such "mud cake." These electrodes 18 and 19 are mounted on the exterior of the packer so that the electrodes engage the formation when the packer is inflated. The bore hole fluid is excluded from the formation in the vicinity of the electrodes 18 and 19 by means of the packer 11.

The device is provided with two additional electrodes 20 and 21 which are mounted in closely spaced relation within the insulating tube 10. The spacing of these electrodes is similar to the spacing of the electrodes 18 and 19. The electrode 18 is electrically connected through a conductor 22 to one terminal of a recorder 23 at the surface of the earth. The other terminal of the recorder 23 is connected by means of a conductor 24 to ground.

The electrode 19 is connected by means of a conductor 25 through an electric switching mechanism described hereinafter to a source of electrical energy 26. The other terminal of the source of electrical energy 26 is connected through a variable resistance 27 and the conductor 25a to the electrode 21.

The electrode 20 is connected by means of a conductor 28 to one terminal of a potential indicating device 29, the other terminal of the device being connected to ground.

Frequently, caves or enlarged portions exist along the bore hole which are caused by the washing action of the circulating drilling fluid. Some of these enlarged portions may be of such a diameter that the flexible packer 11 loses contact with the wall of the bore hole. This, of course, would produce an inaccurate indication of the resistivity of the formation, and inasmuch as the operator could not know when contact is lost, inaccurate indications would be obtained. In order to advise the operator when contact is lost between the packer and the formation, a switching mechanism 30, referred to above, is provided. As best shown in Figure 3, the wall of the packer 11 is provided with a cavity 31 which communicates through a passage 32 with the interior of the packer. A portion 33 of the packer is bowed out slightly adjacent the cavity 31 and carries the electrode 19. At the inner side of this bowed portion is a contact member 34 that is connected to the electrode 19 and is spaced from a contact 35 on the opposite side of the cavity when the electrode 19 loses contact with the wall of the bore hole. When the electrode 19 engages the wall of the bore hole with sufficient pressure, the contacts 34 and 35 engage and complete the circuit from the electrode 19 to the source of energy 26.

If the fluid L in the packer is an insulating medium or only semi-conductive, little or no current will flow between the contacts 34 and 35 when they are disengaged, with the result that only a small current will flow between the electrodes 19 and 21. The decrease in current flow will reduce the potential picked up by the electrode 18, thereby providing an indication at the recorder 23 that a switch 30 is opened.

In operation, the electrode and packer assembly may be lowered into the bore hole below the point of interest. The assembly then is moved upwardly along the bore hole to the point or formation of interest. When the electrodes are in position, the current is sent from the source 26 through the conductors 25 and 25a and the electrodes 19 and 21, thus creating an electrical field in the fluid and the formation. The field causes a potential to be picked up by the electrode 18, this potential being a function of the resistivity of the formation adjacent the electrode 18. The potential appearing between the electrode 18 and ground will be recorded by the recorder 23, thereby producing a curve of the formation resistivity.

Simultaneously, a potential appears on the electrode 20, which potential is a function of the fluid in the immediate vicinity of the electrodes 20 and 21. Inasmuch as these electrodes are in the interior portion of the bore hole and are shielded from the formation by the insulating tube 10, the potential appearing between the electrode 20 and ground is a function of the resistivity of the drilling fluid at that depth. This potential is indicated by the meter 29. Inasmuch as the spacing of the pairs of electrodes and the value of the current in the circuit are known, the resistivity of the formation and the fluid can be calculated by formulae well known in the art. From these calculations, the formation factor may be determined from the equation given above.

If desired, the formation factor may be recorded directly on the recorder 23 if the value of the potential developed at the electrode 20 is held constant. Thus, if a reference point on the meter is chosen and the reading of the meter is maintained at this reference point by adjusting the variable resistance 27, the recorder 23 will provide an indication on its record that is directly proportional to the formation factor. If desired, automatic means of known type may be provided for adjusting the resistance 27. Moreover, a ratiometer of conventional type that indicates the ratio between two currents or voltages may replace the meter 29 and the recorder 23, as shown in Figure 4, thereby providing a direct indication of the formation factor without requiring the current to be held constant.

Figure 4:
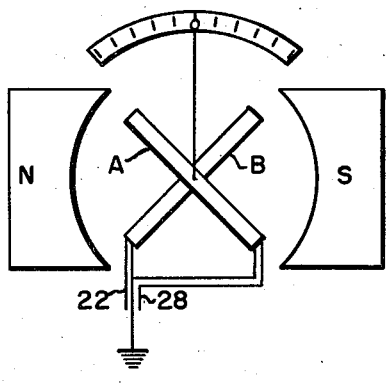
Figure 4 illustrates schematically typical means for indicating the quotient of two electrical values.

Referring to Figure 4, the ratiometer may comprise, for example, a pair of coils A and B mounted in space quadrature and suspended in the magnetic field produced by a pair of permanent magnets N and S. In order to measure the desired ratios directly, the conductors 22 and 28 of Figure 1 may be connected to one terminal of each of the coils A and B, respectively, the other two terminals being connected to ground.

From the preceding description, it will be apparent that I have provided a simple and efficient method and appaartus for determining the formation factor without requiring extensive laboratory tests on cores and complex calculations. On the basis of the formation factors so derived, it is possible to obtain indications of the profitable productivity of the well and also to estimate the amount of oil that is present in the formation.

It will be understood that the method and the apparatus are susceptible to ccnsiderable modification as indicated above; namely, in the type of packer, and the means for inflating the packer, and also in the types, number and spacing of the electrodes. Therefore, the above described embodiments of the invention should be considered as illustrative and not as limiting the scope of the following claims.

I claim:

1. In apparatus for determining the formation factor of a formation traversed by a bore hole containing a liquid, the combination comprising means for creating a first electrical quantity representative of the resistivity of a portion of the formation invaded by the liquid in said bore hole, means for simultaneously creating a second electrical quantity representative of the resistivity of the liquid in the bore hole in the vicinity of said portion of the formation, means for creating a physical quantity based on said first and second electrical quantites which varies in accordance with the quotient of said formation resistivity and bore hole liquid resistivity, and means for obtaining indications of said physical quantity.

2. An apparatus for determining the formation factors of formations traversed by a bore hole, comprising a tubular insulating member adapted to be lowered into a bore hole, a pair of closely spaced electrodes mounted within said member, an expansible member on the exterior of said tube, means for expanding said member into engagement with the wall of the bore hole, and a pair of closely spaced electrodes mounted on said expansible member adapted to engage the wall of the bore hole upon operation of said expanding means, said last-named electrodes being electrically insulated from each other.

3. An apparatus for determining the formation factors of formations traversed by a bore hole containing an electrically-conductive liquid, comprising a first electrode for passing current through the main body of liquid in said bore hole to establish an electric field in said hole, a second electrode adjacent said first electrode for detecting the potential in said hole relative to a reference point, a third electrode mounted in the vicinity of said first and second electrodes for movement therewith for passing current through the wall of said hole to establish an electric field in the surrounding formation, a fourth electrode adjacent said third electrode for detecting the potential of the formation relative to a reference point, and means for urging the third and fourth electrodes into direct electrical communication with the bore hole wall and substantially completely insulating the third and fourth electrodes from direct electrical communication with the main body of liquid in said hole.

4. In a method for determining the formation factors of formations traversed by a bore hole containing electrically-conductive liquid, the steps comprising establishing a current flow in the main body of liquid in said bore hole and through the wall of said bore hole to create an electric field in said bore hole and in the surrounding formation, detecting a first potential between a point on the wall of said bore hole in the path of said current and a reference point, detecting a second potential between a point in the main body of liquid in said bore hole in the path of said current and a reference point, substantially completely blocking the flow of current directly between the point on the wall and the point in the liquid, adjusting the amplitude of the current to maintain constant the second potential, and indicating the formation factor in terms of the first potential.

5. In a method for obtaining indications of the electrical resistivity of material in a thin layer immediately beneath the side wall of a bore hole drilled into the earth and containing a column of relatively conducting liquid, the steps of disposing at least two closely spaced apart electrodes in the bore hole in electrical communication with the small portions of the wall of the bore hole opposite thereto, respectively, substantially completely blocking off direct electrical communication between said electrodes and the bore hole liquid, passing electric current from one of said electrodes into the wall of the bore hole, and obtaining indications of potential difference created by said current between the other of said electrodes and a point at a reference potential.

6. In a method for investigating earth formations traversed by a bore hole drilled into the earth and containing a column of relatively conducting liquid, the steps of disposing at least two closely spaced apart electrodes in the bore hole in electrical communication with the small portions of the wall of the bore hole opposite thereto, respectively, substantially completely blocking off direct electrical communication between said electrodes and the bore hole liquid, passing electric current from one of said electrodes into the wall of the bore hole, obtaining indications of potential difference created by said current between the other of said electrodes and a point at a reference potential, and obtaining indications at the same depth in the bore hole of the electrical resistivity of the conducting bore hole fluid.

7. In apparatus for obtaining indications of the electrical resistivity of material in a thin layer immediately beneath the side wall of a bore hole drilled into the earth and containing a column of relatively conducting liquid, the combination of insulating means having at least one flexible portion adapted to be lowered into a bore hole, means for urging said insulating means against the wall of the bore hole, at least two closely spaced apart electrodes carried by said one flexible portion of said insulating means and having exposed faces adapted to be in electrical communication with the small portions of the wall of the bore hole opposite thereto, said insulating means serving to block off substantially completely direct electrical communication between said electrodes and the bore hole liquid, an electrically energized circuit including one of said electrodes for passing current from the latter into the wall of the bore hole, and means for exhibiting a function of the potential difference created by said current between the other of said electrodes and a point at a reference potential.

8. In apparatus for obtaining indications of the electrical resistivity of material in a thin layer immediately beneath the side wall of a bore hole drilled into the earth and containing a column of relatively conducting liquid, the combination of insulating means having at least one flexible portion adapted to be lowered into a bore hole, means for urging said insulating means against the wall of the bore hole, at least two closely spaced apart electrodes carried by said one flexible portion of said insulating means and having exposed faces adapted to be in electrical communication with the small portions of the wall of the bore hole opposite thereto, said insulating means serving to block off substantially completely direct electrical communication between said electrodes and the bore hole liquid, an electrically energized circuit including one of said electrodes for passing current from the latter into the wall of the bore hole, circuit interrupting switching means connected in said circuit, means responsive to the pressure exerted by said insulating means against the wall of the bore hole for maintaining said circuit closed when the insulating means is against the wall of the bore hole and for opening said circuit when the insulating means is not against the wall of the bore hole, and means for exhibiting a function of the potential difference created by said current between the other of said electrodes and a point at a reference potential.

9. In apparatus for investigating earth formations traversed by a bore hole drilled into the earth and containing a column of relatively conducting liquid, the combination of insulating means having at least one flexible portion adapted to be lowered into a bore hole, means for urging said insulating means against the wall of the bore hole, at least two closely spaced apart electrodes carried by said one flexible portion of said insulating means and having exposed faces adapted to be in electrical communication with the small portions of the wall of the bore hole opposite thereto, said insulating means serving to block off substantially completely direct electrical communication between said electrodes and the bore hole liquid, a third electrode disposed in the bore hole liquid and movable with said two electrodes, a fourth electrode in the bore hole liquid and in fixed, closely spaced relation to said third electrode, electrically energized circuit means including one of said two electrodes and said third electrode for passing current into the wall of the bore hole and into the bore hole liquid, respectively, means for exhibiting a function of the potential difference between the other of said two electrodes and a point at a reference potential, and means for exhibiting a function of the potential difference between said fourth electrode and a point at a reference potential.

10. An electrode assembly for the electric logging of bore holes comprising an elongated flexible insulating sleeve adapted to contact substantially the entire periphery of the bore hole, at least one electrode carried by said sleeve in a section intermediate its ends, said electrode being insulated from the interior of said sleeve but electrically accessible from the exterior of said sleeve, and means for supporting said sleeve in said bore hole and for pressing its upper periphery into contact with the periphery of the bore hole.

11. An electrode assembly according to claim 10 in which an additional electrode is supported adjacent the lower end of said sleeve on insulated supporting means disposed within said sleeve.

12. In well logging apparatus, the combination of a hollow, cushion member containing a quantity of fluid and having a flexible wall adapted to engage the well wall, means mounting said cushion member for movement through a well with the flexible wall thereof in engagement with the well wall, and electrode means carried by said flexible wall for providing electrical communication with the well wall.

13. In well logging apparatus, the combination of a hollow, cushion member containing a quantity of liquid and having a flexible wall adapted to engage the well wall, means mounting said cushion member for movement through a well with the flexible wall thereof in engagement with the well wall, yielding means urging said cushion member against the well wall, and electrode means carried by said flexible wall for providing electrical communication with the well wall.

14. In well logging apparatus, the combination of a support adapted to be lowered into a well, a hollow cushion member mounted on said support and containing a quantity of liquid, said cushion member having a flexible outer wall adapted to engage the well wall, electrode means carried by said flexible outer wall for providing electrical communication with the well wall, and yielding means cooperating with said support for urging said cushion member against the well wall and for centering said support in the well.

15. In well logging apparatus, the combination of a support adapted to be lowered into a well, a hollow cushion member mounted on said support and containing a quantity of liquid, said cushion member having a flexible outer wall adapted to engage the well wall, electrode means and conducting means carried by said flexible outer wall for providing electrical communication with the well wall, said conducting means electrically communicating with said electrode means upon the engagement of said electrode means with the well wall and said conducting means being electrically insulated from said electrode means upon the disengagement of said electrode means from the well wall.

16. In well logging apparatus, the combination of a hollow, cushion member containing a quantity of fluid and having a flexible wall adapted to engage the well wall, means mounting said cushion member for movement through a well with the flexible wall thereof in engagement with the well wall, an electrode means and conducting means carried by said flexible wall for providing electrical communication with the well wall, said conducting means contacting said electrode means upon the engagement of said electrode means with the well wall and said conducting means being spaced from said electrode means upon the disengagement of said electrode means from the well wall.

17. An apparatus for determining the formation factors of formations traversed by a bore hole containing liquid, comprising two pairs of electrodes adapted to be lowered into the bore hole, the electrodes in each of said pairs being closely spaced apart, means for urging one of said pairs of electrodes into contact with the wall of the bore hole, means for positioning the other of said pairs of electrodes in the bore hole liquid in the vicinity of said one pair of electrodes, means for substantially completely insulating said one pair of electrodes from direct electrical communication with the main body of the bore hole liquid while permitting direct electrical communication of said one pair of electrodes with the wall of the bore hole, electrically energized circuit means including one electrode of said one pair of electrodes and one electrode of said another pair of electrodes for passing current into the wall of the bore hole and into the bore hole liquid, respectively, and separate indicating means electrically connected to the other electrodes of each of said pairs of electrodes and to corresponding reference points for indicating the resistivity of said formations and said liquid.

HENRI-GEORGES DOLL.

References Cited in the file of this patent

UNITED STATES PATENTS

| Number | Name | Date |
| --- | --- | --- |
| 1,537,919 | Elliott | May 12, 1925 |
| 1,826,961 | Slichter | Oct. 13, 1931 |
| 1,895,643 | Putnam | Jan. 31, 1933 |
| 2,233,420 | Leonardon | Mar. 4, 1941 |
| 2,330,394 | Stuart | Sept. 28, 1943 |
| 2,364,957 | Douglas | Dec. 12, 1944 |
| 2,392,357 | Bays | Jan. 8, 1946 |
| 2,415,636 | Johnson | Feb. 11, 1947 |
| 2,427,950 | Doll | Sept. 23, 1947 |

OTHER REFERENCES

Heiland test, "Geophysical Exploration," pp. 825–831, pub. 1940 by Prentice Hall, Inc.